United States Patent [19]
Dage et al.

[11] Patent Number: 6,052,998
[45] Date of Patent: Apr. 25, 2000

[54] METHOD FOR DETERMINING BLOWER PURGE TIME

[75] Inventors: Gerhard Allan Dage, Franklin; John Barkley, Novi, both of Mich.

[73] Assignee: Ford Motor Company, Dearborn, Mich.

[21] Appl. No.: 09/160,024

[22] Filed: Sep. 24, 1998

[51] Int. Cl.$^7$ .............................. F25D 17/06; F25D 21/00
[52] U.S. Cl. .................................. 62/89; 62/178; 62/282
[58] Field of Search ............................... 62/89, 178, 231, 62/282

[56] References Cited

U.S. PATENT DOCUMENTS

| | | | |
|---|---|---|---|
| 3,662,818 | 5/1972 | Snyder | 165/23 |
| 4,848,444 | 7/1989 | Heinle et al. | 165/21 |
| 4,858,676 | 8/1989 | Bolfik et al. | 165/2 |
| 4,917,293 | 4/1990 | Fedter et al. | 236/49.3 |
| 4,932,588 | 6/1990 | Fedter et al. | 236/44 R |
| 5,385,028 | 1/1995 | Gavlak | 62/81 |
| 5,427,313 | 6/1995 | Davis, Jr. et al. | 236/49.3 |
| 5,546,754 | 8/1996 | Terao et al. | 62/133 |
| 5,553,776 | 9/1996 | Davis, Jr. et al. | 236/49.3 |
| 5,572,877 | 11/1996 | Ikeda et al. | 62/231 X |
| 5,615,491 | 4/1997 | Bae | 34/61 |
| 5,899,082 | 5/1999 | Stein et al. | 62/282 |

FOREIGN PATENT DOCUMENTS 576496  10/1977  U.S.S.R. ............................... 62/176.6

*Primary Examiner*—William Wayner
*Attorney, Agent, or Firm*—Roger L. May; Frank G. McKenzie

[57] ABSTRACT

A method for operating a blower of an vehicle air conditioning (a/c) system after ignition off for purging moisture from an evaporator core includes accumulating a/c system data while the a/c system is operating including a/c on time, duty cycle, ambient temperature and mode of operation. When the ignition switch is turned off terminating operation the a/c system, updated data is saved for use in a look up table. A moisture index is selected from the look up table after ignition off as a function of a/c duty cycle, ambient temperature and mode of operation. The moisture index is a measure of the amount of moisture accumulated on the evaporator core which is a function of the a/c duty cycle, ambient temperature and fresh air or recirculated air mode of operation. The blower operates at a speed and for a duration dictated by the moisture index to purge moisture rather than simply operating for a set period of time regardless of moisture present.

20 Claims, 5 Drawing Sheets

METHOD FOR DETERMINING BLOWER PURGE TIME

TECHNICAL FIELD OF THE INVENTION

The present invention relates generally to heating, ventilating and air conditioning (HVAC) systems, and, more particularly, to a method for purging moisture from a vehicle HVAC after the ignition switch is turned off.

BACKGROUND OF THE INVENTION

During air conditioner (a/c) operation in a heating, ventilating and air conditioning (HVAC) system in a vehicle, moisture condenses on the evaporator core from out of the air that is being conditioned. The air is cooled by an evaporator and moisture physically condenses on the evaporator core. Because of the core design, this moisture often accumulates on the core fins. Because the evaporator core must be an efficient heat exchanger, it is designed with louvered or cupped fins. While these fins are efficient for forced air convection, they naturally tend to retain moisture during and after normal a/c operation. A blower motor moves air across the fins at various selectable speeds depending upon the amount of heat exchange that is required. The amount of heat exchange depends upon the amount of cooling required for operator and passenger comfort. At higher blower speeds, there is more condensing action on the evaporator core but also more moisture likely to be blown off of the evaporator core.

When the vehicle is inoperative or the HVAC is turned off, air surrounds the moisture laden evaporator core within a plenum, chamber or ducting system. This provides an environment for bacteria, fungus and other organisms which can cause offensive odors in the vehicle. U.S. Pat. No. 3,662,818 which issued May 16, 1972 to Snyder addresses the moisture problem by providing a purge outlet which is open to the passenger compartment of the vehicle when the HVAC system is inoperative to maintain a continuous flow of air through the plenum chamber. This air flow prevents the formation of odor and humidity in the plenum chamber. Thereafter, when the system is activated, the purge outlet is closed. Unfortunately, there is air flow only when the ignition switch is on, therefore, moisture remains on the evaporator core to promote odor.

Later attempts to remove moisture operate the blower after the ignition switch is turned off for a set period of time regardless of moisture conditions which is inefficient. U.S. Pat. No. 5,385,028 which issued Jan. 31, 1995 to Gavlak improves moisture removal by briefly turning the blower on high speed to blow off excess moisture, then turning the blower on low speed or off while heating the core by recirculating refrigerant. Thereafter, when a high enough temperature for moisture elimination is reached, the blower and recirculation of refrigerant is discontinued. A problem with this approach is it requires energy drawn from the vehicle battery and it is possible to reduce the state of charge of the battery below a minimum threshold level required for starting the vehicle. Accordingly, it will be appreciated that it would be highly desirable to efficiently purge moisture without reducing the state of charge of the vehicle battery below the minimum threshold required for starting the vehicle.

SUMMARY OF THE INVENTION

The present invention is directed to overcoming one or more of the problems set forth above. Briefly summarized, according to one aspect of the present invention, a method for operating a blower of an air conditioning system for purging moisture includes turning a ignition switch on, operating the a/c system while the ignition switch is on, and accumulating a/c system data while the a/c system is operating after the a/c system has operated for a predetermined minimum period of time. The a/c system data accumulated includes on time, duty cycle, ambient temperature, mode of operation and relative humidity which is optional and not required but does improve precision. The data is periodically updated while the a/c system is operating with the ignition switch on. When the ignition switch is turned off terminating operation the a/c system, updated data is saved for use in a look up table. A moisture index is chosen from the look up table after ignition off as a function of duty cycle, ambient temperature and mode of operation. The blower is operated at a speed and for a duration dictated by the moisture index to purge moisture.

The present invention operates the blower after ignition off efficiently by setting blower speed and duration according to the amount of moisture to be removed. By waiting for four minutes before accumulating data, the a/c system is allowed time to cool the vehicle cabin and stabilize so that accurate readings are possible. Setting a maximum operating time for the blower ensures that it will not operate needlessly to drain the vehicle battery. By monitoring the state of charge of the vehicle battery, blower operation can be halted if the state of charge falls below a minimum threshold. This ensures that energy is always available to start the vehicle.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
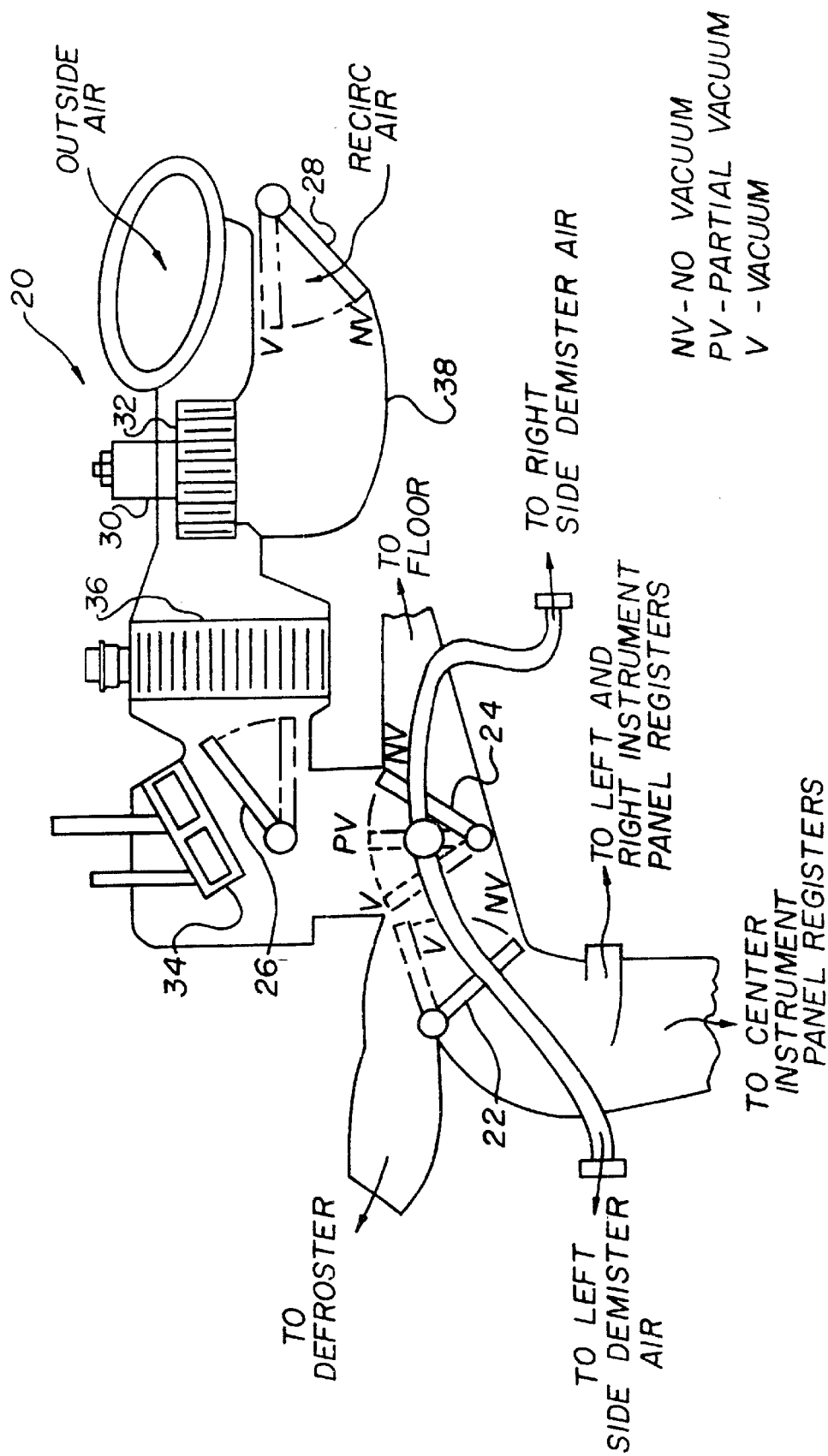
FIG. 1 is a diagram illustrating an air handling system with a blower which can be operated according to the method of the present invention.

FIG. 1 is a schematic diagram illustrating an air handling system as described in U.S. Pat. No. 5,553,776 which issued Sep. 10, 1996 to Leighton I. Davis, Jr., et al. and U.S. Pat. No. 5,427,313 which issued Jun. 27, 1995 to Leighton I. Davis, Jr., et al., the disclosures of which are incorporated herein by reference. The air handling system 20 of a heating, ventilation and air conditioning (HVAC) system, includes an arrangement of panel-defrost, floor-panel, temperature blend and outside recirculation air actuators or doors 22, 24, 26 and 28, respectively. A of the doors 22 and 24 may be driven by vacuum or electric motors (not shown) between their various vacuum, partial vacuum and no vacuum positions in a conventional fashion as indicated by broken lines. Door 26 may be driven by an electric servomotor so that the position of the door is continuously variable. The system also includes a variable speed motor 30 including a blower wheel 32. The system further includes heating and cooling elements such as a heater core 34 and an evaporator core 36 in a typical air conditioning plant. The evaporator temperature is normally controlled in a conventional automatic fashion to allow the system to dehumidify air passing thereover. The plant includes a compressor which is selectively coupled to the vehicle's engine by a control element such as an a/c clutch in a clutch cycling orifice tube (CCOT) system. Typically, the plant also includes a condenser, a refrigerant tank, pressure cycling switch, and an expansion orifice or capillary.

Figure 2:
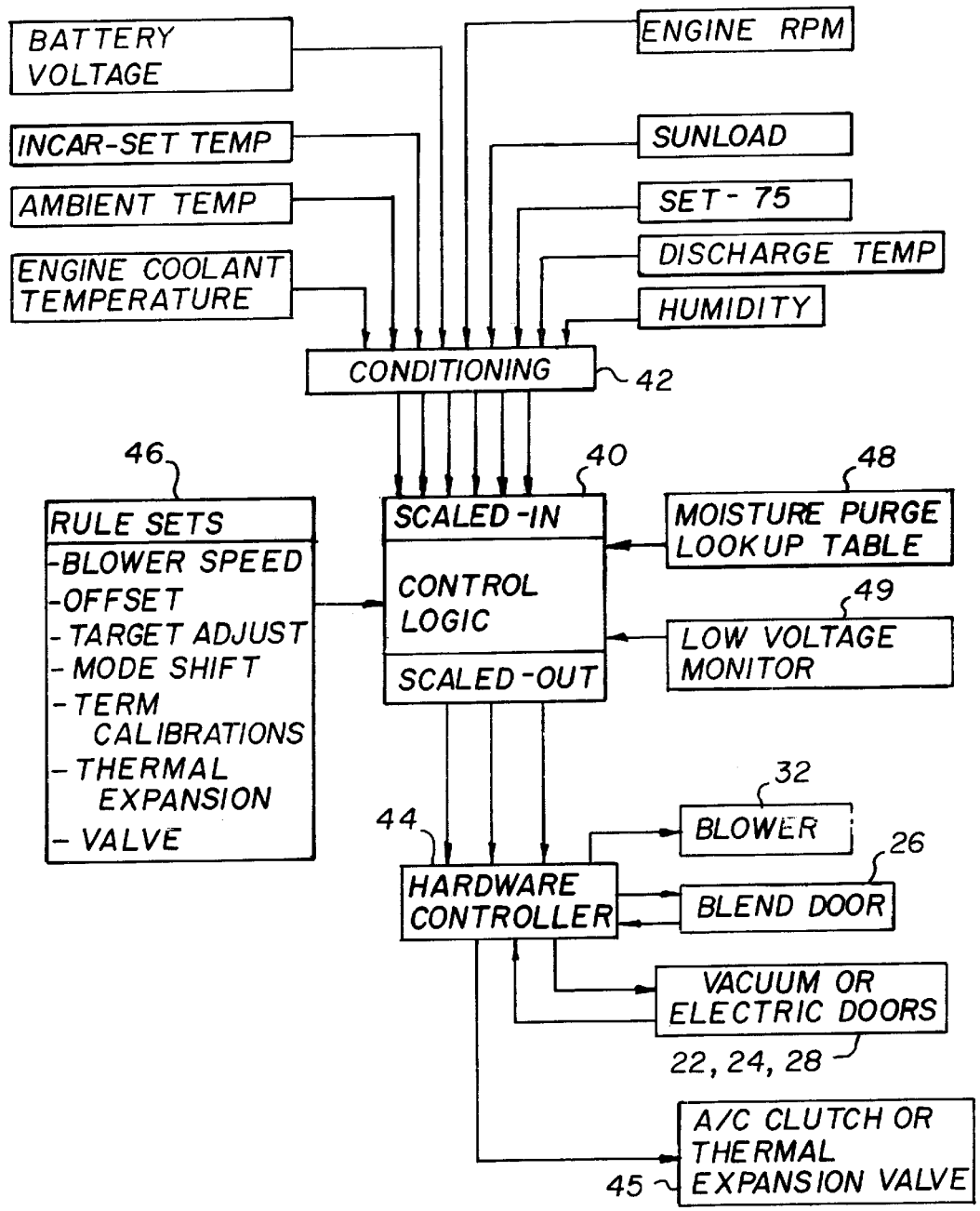
FIG. 2 is a schematic block diagram of the control system for operating the blower.

Referring to FIG. 2, for automatic control of the temperature and air flow in the cabin, conditions within and outside the cabin are monitored by sensors and a microprocessor based electronic controller generates signals to control the plant actuators according to the conditions as indicated by the sensors. A typical complement of sensors of the HVAC system provide signals which are representative of in-car temperature, ambient (outside) air temperature, engine coolant temperature (ECT), battery voltage, engine rpm, discharge air temperature, humidity and sunload. In addition, there is a set signal or set temperature value indicating the desired temperature that is set manually by the vehicle operator. In turn, an incar-set temperature (in-car minus set temperature) signal and a set–75 (set temperature minus 75° F.) signal are generated or calculated. In addition, blower speed, vehicle speed, a/c clutch duty cycle and time in air recirculation mode are determined.

The signals are provided to the controller 40 as inputs after being conditioned by a conditioning circuit 42. The controller 40 scales the input signals and provides scaled output signals for use by a hardware controller 44 which, in turn, controls the doors 22, 24, 26 and 28, the blower 32 and clutch to regulate the temperature and flow of air. Rule sets 46 for the various control functions-blower speed, offset, target set point, mode shift, recirculation/fresh ratio, term calibrations, clutch cycling rate or expansion valve position, etc.-provide the controller with details of the strategy to be performed. A moisture purge lookup table 48 provides the controller with details of the strategy to be performed to purge moisture when the ignition switch is turned off. A low voltage monitor 49 or the like monitors battery voltage and state of charge of the battery.

The control strategy depends upon a moisture purge index that is determined experimentally. During air conditioner operation, moisture is condensed out of the air which is being cooled by the evaporator. The condensing action takes physically place on the evaporator core. By nature of the core design, moisture frequently accumulates on the evaporator core fins. The core is designed to be efficient and as a result it is designed with louvered or cupped fins. While these fins are efficient for forced air convection they naturally tend to retain water during and after normal a/c operation. By design, the blower motor moves air across the fins at various selectable speeds depending upon the amount of heat exchange that is required, which in turn, depends on the amount of cooling required for occupant comfort. At higher speeds, there is more condensing action on the evaporator core but also more water is likely to be blown off of the core. The amount of moisture that has accumulated on the evaporator core when the vehicle is being parked is determined experimentally.

Data is collected and a moisture index is assigned from which blower speed and duration are determined for purging. Collected data may include the a/c clutch duty cycle, blower speed, engine rpm, outside ambient air temperature, inside relative humidity, and mode of operation-fresh air or recirculated air.

Figure 3:
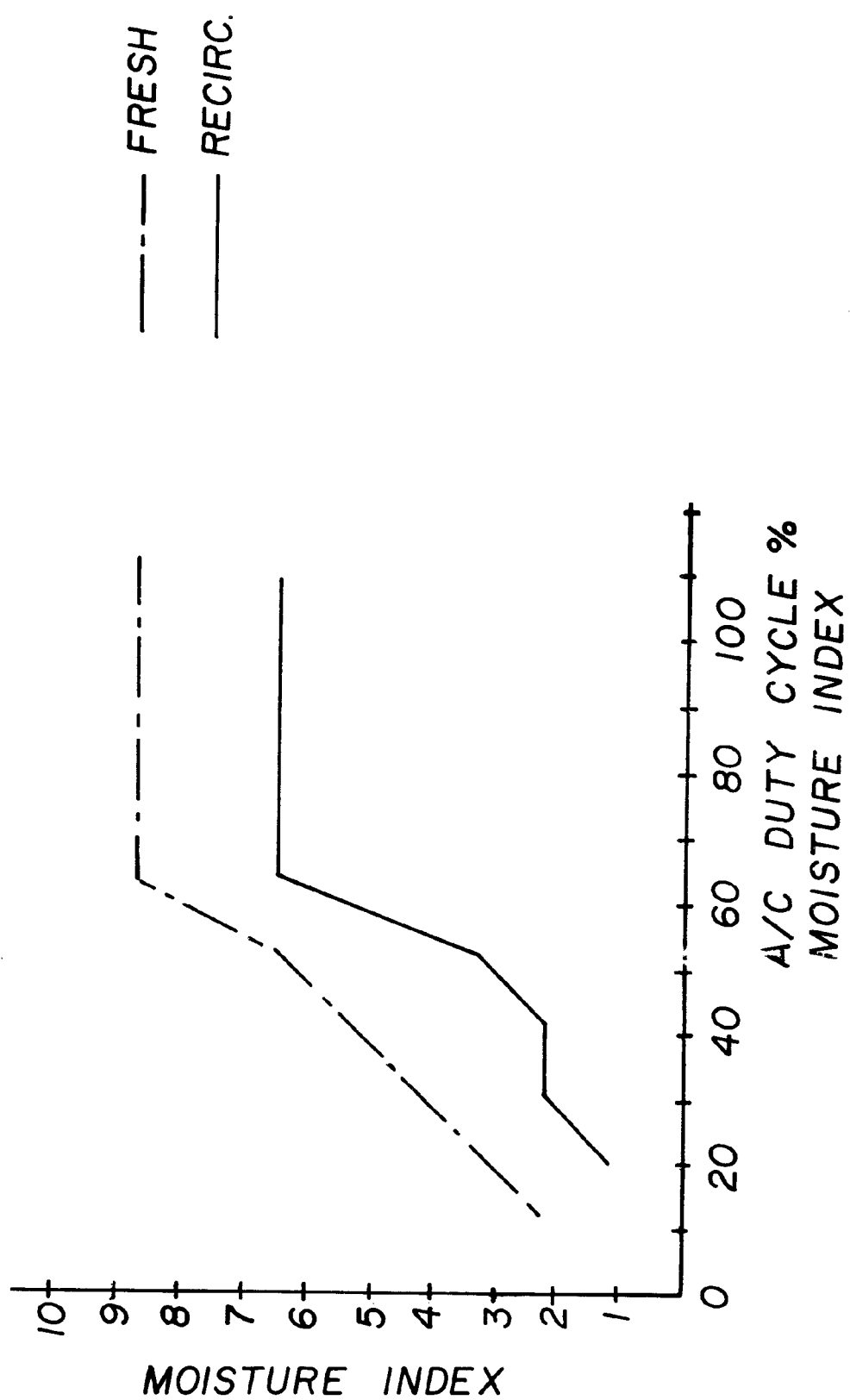
FIG. 3 graphically illustrates the observed relationship between the moisture index and duty cycle.

FIG. 3 graphically illustrates the observed relationship between the moisture index and duty cycle. The moisture index rises as the duty cycle increases but levels off at about 60% duty cycle. When the mode of operation calls for injecting fresh air, the moisture index rises faster and goes higher than when recirculated air is used. This results seems logical because the fresh, warm, outside air is more humid than the conditioned recirculated air. Experiments prove that, in all cases, a higher moisture index is obtained when operating in a fresh air mode than when operating in a recirculated air mode.

Understandably, as ambient temperature increases, the air conditioner will have to work harder to maintain inside temperature and relative humidity. It is seen that there is an increase in the moisture index as the duty cycle increases and as ambient temperature increases. The moisture index is a function of blower speed, engine rpm and a/c duty cycle, and is affected by ambient temperature and relative humidity. In the recirculation mode, the moisture index is typically lower than for the same conditions in the fresh air mode because of the lower moisture content of recirculated air. The moisture content is lower because moisture is removed in a continuous cycle from recirculated air as it condenses on the evaporator core.

Figure 4:
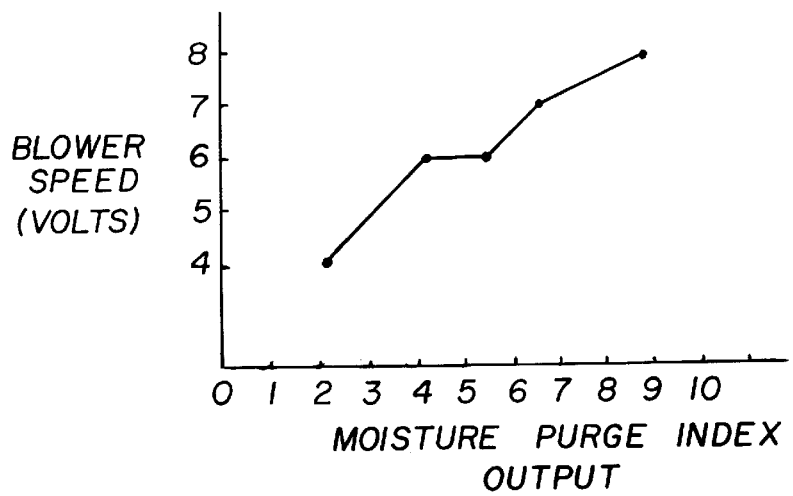
FIG. 4 graphically illustrates the observed relationship between the moisture index and blower purge speed.

FIG. 4 graphically illustrates the observed relationship between the moisture index and blower purge speed. Because a higher moisture index indicates that there is more moisture to be removed, blower speed increases with the moisture index to keep blower purge time within acceptable limits to ensure that the evaporator core will be dry. As illustrated, blower speed is charted in volts with higher voltages yielding higher blower speeds than lower voltages. By knowing what voltage is required to purge moisture for a given moisture index, battery energy can be budgeted.

Figure 5:
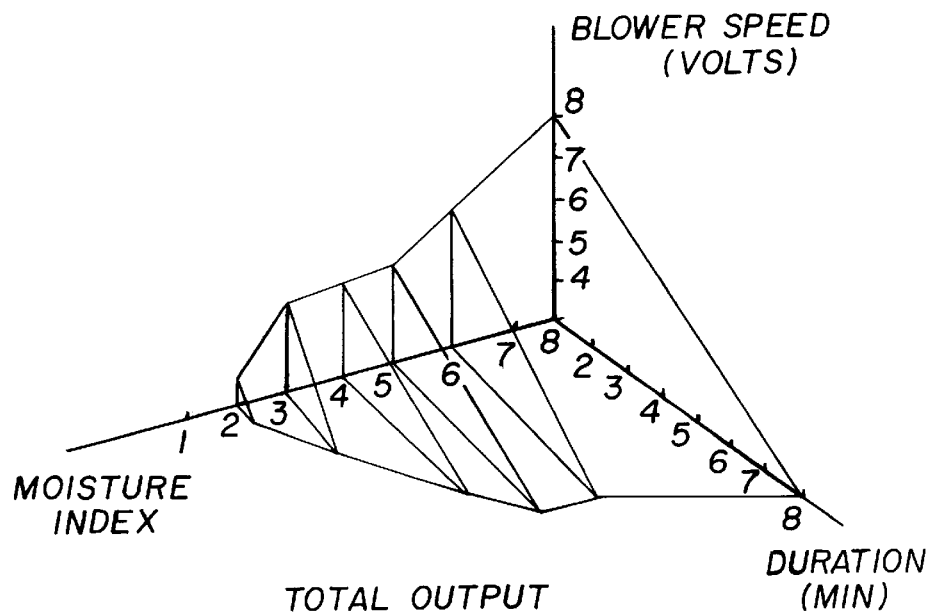
FIG. 5 is a three axis graphical illustration of observed relationships between the moisture index, blower purge speed and blower on time.

FIG. 5 is a three axis graphical illustration of the observed relationships between the moisture index, blower purge speed and blower on time in minutes. As mentioned, blower speed increases as the moisture index increases, blower duration also increases as the moisture index increases.

Figure 6:
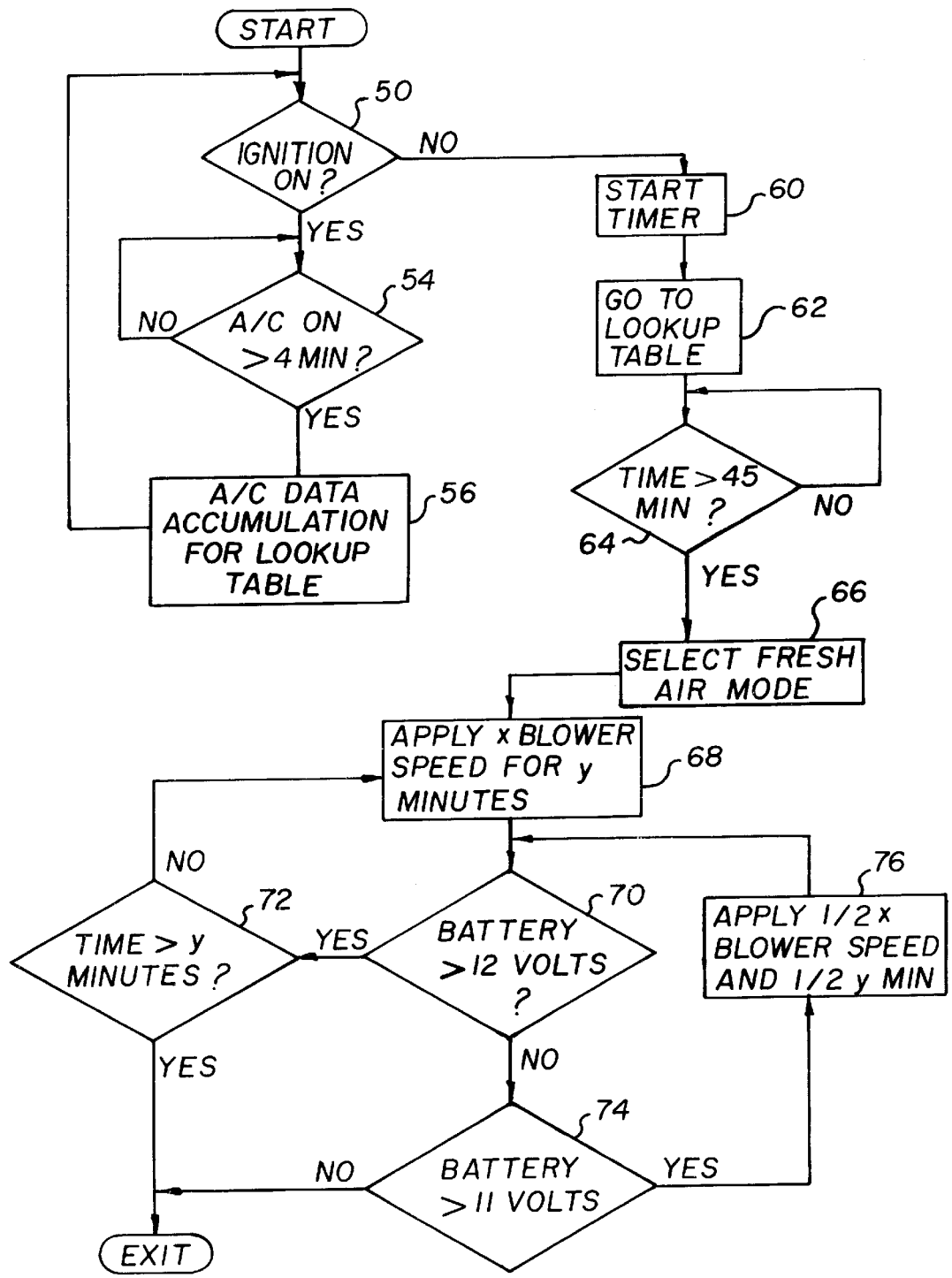
FIG. 6 is a flow chart depicting operation of the blower according to the present invention.

FIG. 6 is a flow chart of the operation of the blower according to the present invention. During normal vehicle operation, the ignition switch is on. A query is made at block 50 regarding whether the ignition switch is on or not. If the switch is on, then it is determined at block 54 whether the a/c on time has exceeded four minutes. If so, then at block 56 data is accumulated for the look up table. Data for the table is taken after the a/c has operated for about four minutes to give the system time to lower cabin temperature and stabilize.

If the ignition switch is still on when the a/c has operated for longer than four minutes, data accumulation continues and refreshes data in the look up table. Again, at block 50, if the ignition has been turned off, the timer starts at block 60. If the ignition switch is not on, then a timer is started at block 60, the look up table is accessed at block 62, and the timer is read at block 64. When elapsed time since ignition off reaches 45 minutes, the blower is turned on to operate at the speed and for the duration in the lookup table. When elapsed time is greater than 45 minutes, the a/c system is put in the fresh air mode at block 66, and the blower is turned on at block 68. The blower operates for at x speed for y minutes according to values obtained from the look up table.

Preferably, once the timer has exceeded the 45 minutes, the blower operates at the one selected speed for the entire duration. Thus, blower speed and duration are preferably fixed and do not vary as the evaporator core moisture level changes during purging.

If desired, controller 40 can be programmed to alter blower speed and thus duration. For example, when energy consumption must be absolutely minimized, a slower blower speed may be more economical even though drying time is extended. For example, if the moisture index indicates a blower speed corresponding to 8 volts and a duration of 8 minutes are required, then less energy will be required if blower speed is lowered after 3 minutes even though the drying time would be extended somewhat.

Energy consumption is a concern because the purging operation occurs when the engine is off and stored energy is used for operation. It is desirable to maintain a threshold state of battery charge that is sufficient for operating required systems and starting the vehicle under varying conditions. The state of charge is considered at block 70 and if it falls below the threshold, the purging system is exited stopping the blower. The state of charge of the battery may be indicated by the battery voltage level from battery monitor 49. Battery voltage drops when energy is consumed with the ignition, and therefore the engine and battery charging system, off. When charging, the battery terminal voltage is greater than its rated 12 volts. When the battery voltage is above the threshold at block 70, then at block 72 it is determined if the blower on time has expired indicating that blower purging should cease.

The blower continues operation at x blower speed until y minutes elapse, unless battery voltage falls below a first threshold voltage level at block 70. For example, in a nominal 12 volt system, at fully charge the battery is, at least, at its nominal voltage. As the battery discharges it will fall to its nominal voltage and fall below that value as discharge continues. There is a second threshold value, 11 volts for example in a nominal 12 volt system, below which it is not prudent to further discharge the battery for purging operations. If battery voltage falls below a first threshold voltage level at block 70, a query is made at block 74 as to whether battery voltage is above the second, lower threshold. If the battery voltage drops but remains above the second threshold, then blower operation continues at block 76 but at a reduced speed and/or duration to conserve energy. The purging system is exited if the battery voltage drops below the second threshold.

It can now be appreciated that method for operating a blower of an air conditioning system for purging moisture has been presented whereby a/c system data and other data are collected after the air conditioning system has operated for a few minutes. After turning the ignition switch off and terminating operating the air conditioning system, updated data is saved in a look up table. Choosing a moisture index after ignition off from the look up table as a function of a/c duty cycle, engine rpm and blower speed facilitates operating the blower at a speed and for a duration dictated by the moisture index. The blower purging operation is postponed 45 minutes after ignition off so that the HVAC system has warmed up and so that purging is conducted when the operator is not as likely to be present so as to be less conspicuous.

As is evident from the foregoing description, certain aspects of the invention are not limited to the particular details of the examples illustrated, and it is therefore contemplated that other modifications and applications will occur to those skilled in the art. For example, various combinations of blower speed and duration may be used to effect drying and conserve energy when the battery voltage is below the first threshold but above the second threshold. Also, the timer may be reset for a different interval than 45 minutes to accommodate differing driving patterns and driver habits. It is accordingly intended that the claims shall cover all such modifications and applications as do not depart from the true spirit and scope of the invention.

What is claimed is:

1. A method for operating a blower of an air conditioning system for purging moisture, comprising the steps of:

turning a ignition switch on;

operating the air conditioning system while the ignition switch is on;

accumulating air conditioning system data while the air conditioning system is operating after the air conditioning system has operated for a predetermined minimum period of time, said air conditioning system data including on time, duty cycle, blower speed, ambient temperature and mode of operation;

periodically updating accumulated data;

turning the ignition switch off and terminating operating the air conditioning system;

saving updated data in a look up table;

choosing a moisture index after ignition off from said look up table as a function of duty cycle, blower speed, ambient temperature and mode of operation; and operating the blower at a speed and for a duration dictated by said moisture index.

2. The method of claim 1, including, before the operating the blower step, waiting for a preselected period of time.

3. The method of claim 1 including the step of ceasing blower purging operation when blower operates for a predetermined length of time greater than time dictated by moisture index.

4. The method of claim 1 including the steps of:

monitoring state of charge of vehicle battery;

reducing power consumption of the blower by reducing one of blower speed, blower duration and blower speed and duration when the state of charge of the vehicle battery falls below a first predetermined minimum level; and ceasing blower purging operation when the state of charge of the vehicle battery falls below a second predetermined minimum level.

5. The method of claim 1 wherein the moisture index choosing step includes:

experimentally determining moisture accumulation at varying conditions including variations of duty cycle, ambient temperature and mode of operation; and assigning a moisture index indicative of moisture accumulation correlated to duty cycle, ambient temperature and mode of operation.

6. The method of claim 1 including the steps of:

determining whether the air conditioning system data has been accumulated for at least said preselected threshold period of time; and configuring the air conditioning system in a fresh air intake mode when the air conditioning system data has been accumulated for a period of time at least equal to said preselected threshold period of time.

7. The method of claim 1 including the steps of:

determining whether the air conditioning system data has been accumulated for more than a preselected threshold period of time; and configuring the air conditioning system in a recirculation mode when the air conditioning system data has been accumulated for a period of time less than said preselected threshold period of time.

8. A method for operating a blower of an air conditioning system for purging moisture from an evaporator core in a vehicle, comprising the steps of:

turning a ignition switch on;

operating the air conditioning system while the ignition switch is on;

accumulating data while the air conditioning system is operating after the air conditioning system has operated for a predetermined minimum period of time, said data including air conditioner on time, duty cycle, vehicle engine rpm and blower speed;

periodically updating accumulated data;

turning the ignition switch off and terminating operating the air conditioning system;

saving updated data in a look up table;

choosing a moisture index after ignition off from said look up table as a function of air conditioner on time, duty cycle, vehicle engine rpm and blower speed; and operating the blower at a speed and for a duration dictated by said moisture index.

9. The method of claim 8, before the operating the blower step, waiting for a preselected period of time.

10. The method of claim 8 including the steps of:

monitoring state of charge of vehicle battery;

reducing power consumption of the blower by reducing one of blower speed, blower duration and blower speed and duration when the state of charge of the vehicle battery falls below a first predetermined minimum level; and ceasing blower purging operation when the state of charge of the vehicle battery falls below a second predetermined minimum level.

11. The method of claim 8 including the step of ceasing blower purging operation when blower operates for a predetermined length of time greater than time dictated by moisture index.

12. The method of claim 8 wherein the moisture index choosing step includes:

experimentally determining moisture accumulation at varying conditions including variations of duty cycle, ambient temperature and mode of operation; and assigning a moisture index indicative of moisture accumulation correlated to duty cycle, ambient temperature and mode of operation.

13. The method of claim 8 including the steps of:

determining whether the air conditioning system data has been accumulated for at least a preselected threshold period of time; and configuring the air conditioning system in a fresh air intake mode when the air conditioning system data has been accumulated for a period of time at least equal to said preselected threshold period of time.

14. The method of claim 8 including the steps of:

determining whether the air conditioning system data has been accumulated for more than a preselected threshold period of time; and configuring the air conditioning system in a recirculation mode when the air conditioning system data has been accumulated for a period of time less than said preselected threshold period of time.

15. A method for operating a blower of an air conditioning system for purging moisture, comprising the steps of:

turning a ignition switch on;

operating the air conditioning system while the ignition switch is on;

accumulating air conditioning system data while the air conditioning system is operating after the air conditioning system has operated for a predetermined minimum period of time, said air conditioning system data including on time, duty cycle, ambient temperature and mode of operation;

periodically updating accumulated data;

turning the ignition switch off and terminating operating the air conditioning system;

saving updated data in a look up table;

starting a timer;

choosing a moisture index after ignition off from said look up table as a function of duty cycle, ambient temperature and mode of operation;

waiting for timer to indicate a passing of a preselected amount of time; and operating the blower at a speed and for a duration dictated by said moisture index.

16. The method of claim 15 including the steps of:

monitoring state of charge of vehicle battery;

reducing power consumption of the blower by reducing one of blower speed, blower duration and blower speed and duration when the state of charge of the vehicle battery falls below a first predetermined minimum level; and ceasing blower purging operation when the state of charge of the vehicle battery falls below a second predetermined minimum level.

17. The method of claim 15 including the step of ceasing blower purging operation when blower operates for a predetermined length of time greater than time dictated by moisture index.

18. The method of claim 16 wherein the moisture index choosing step includes:

experimentally determining moisture accumulation at varying conditions including variations of duty cycle, ambient temperature and mode of operation; and assigning a moisture index indicative of moisture accumulation correlated to duty cycle, ambient temperature and mode of operation.

19. The method of claim 15 including the steps of:

determining whether the air conditioning system data has been accumulated for at least a preselected threshold period of time; and configuring the air conditioning system in a fresh air intake mode when the air conditioning system data has been accumulated for a period of time at least equal to said preselected threshold period of time.

20. The method of claim 15 including the steps of:

determining whether the air conditioning system data has been accumulated for more than a preselected threshold period of time; and configuring the air conditioning system in a recirculation mode when the air conditioning system data has been accumulated for a period of time less than said preselected threshold period of time.

* * * * *